United States Patent [19]

Hauduc

[11] 4,353,291

[45] Oct. 12, 1982

[54] BRAKING BOOSTER SERVO UNIT HAVING A FIXING BRACING MEMBER

[75] Inventor: Jean J. Hauduc, Tremblay-les-Gonesse, France

[73] Assignee: Societe Anonyme D.B.A., Paris, France

[21] Appl. No.: 249,287

[22] Filed: Mar. 30, 1981

[30] Foreign Application Priority Data

Apr. 25, 1980 [FR] France ............................. 80 09346

[51] Int. Cl.³ .......................... F01B 19/00; F16J 3/02
[52] U.S. Cl. .......................................... 92/99; 92/128
[58] Field of Search .................. 92/98 D, 99, 128; 60/547 R, 552, 554; 403/388, 281, 337; 411/92, 95, 544

[56] References Cited

U.S. PATENT DOCUMENTS

| 2,192,548 | 3/1940 | Gunderson | 92/99 |
| 3,499,288 | 3/1970 | Randol | 60/554 |
| 3,727,405 | 4/1973 | Randol | 60/552 |
| 4,207,807 | 6/1980 | Takata | 92/128 |
| 4,270,353 | 6/1981 | Thomas | 60/547 R |

Primary Examiner—Martin P. Schwadron
Assistant Examiner—Ali I. Tangoren
Attorney, Agent, or Firm—Leo H. McCormick, Jr.; Ken C. Decker

[57] ABSTRACT

Servo unit provided with an internal bracing member which is stressed upon assembly, permitting mounting thereof to a vehicle by means of only two fixing screws. The bracing member has an initial shape which is curved in a given direction, forming a clearance between the inside face of the mounting wall and two regions of the bracing member against which the screws bear. The clearance is eliminated when the bracing member is pressed against the inside face at the moment of definitive fixing of the screws with respect to the casing. The bracing member of the invention provides for better distribution over the whole of the inside face of the braking reaction forces which are applied to the casing.

4 Claims, 6 Drawing Figures

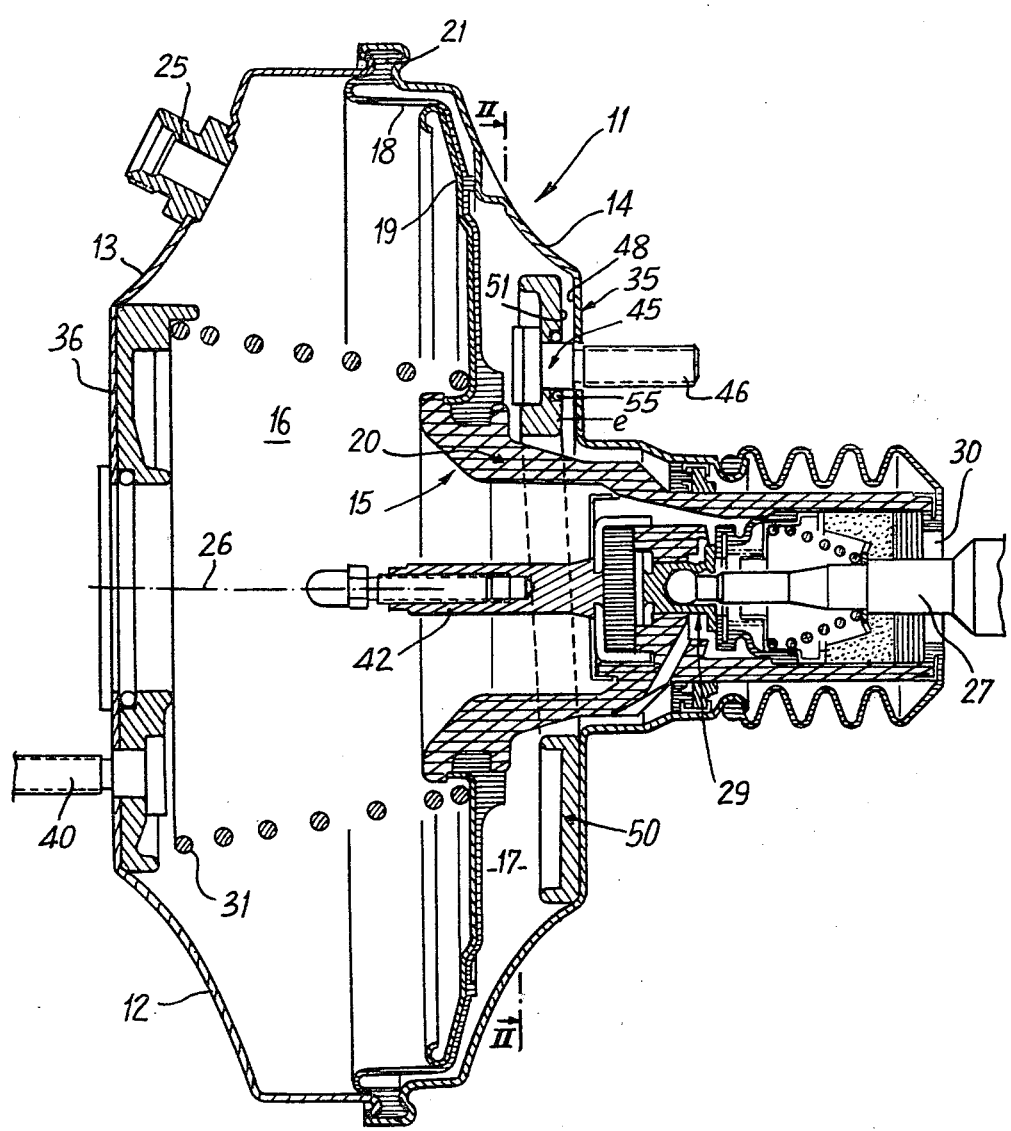

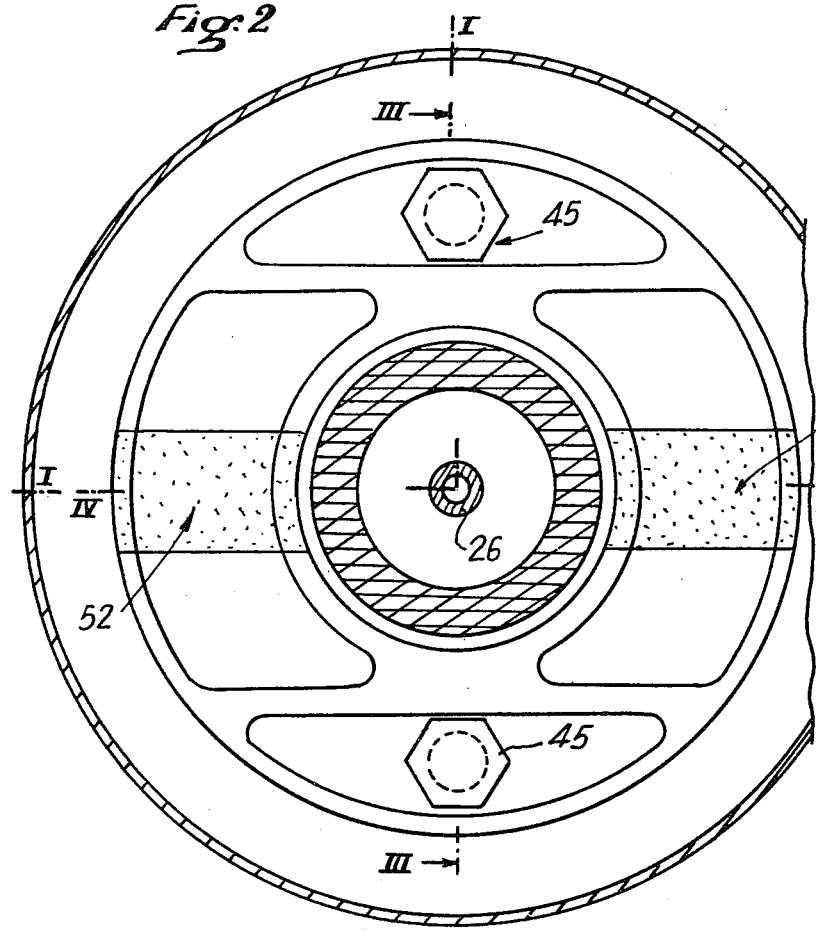
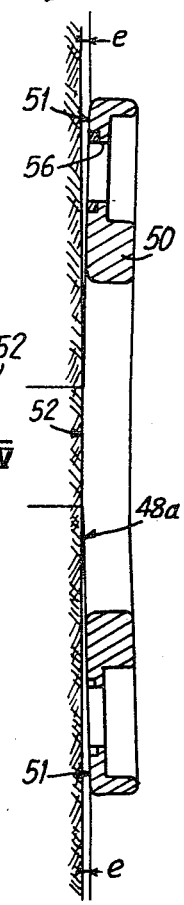
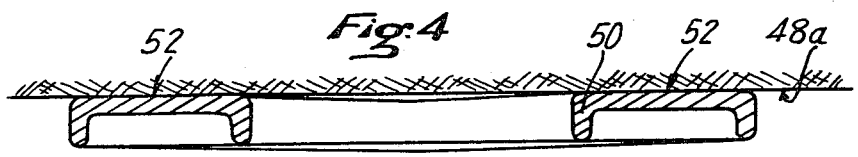
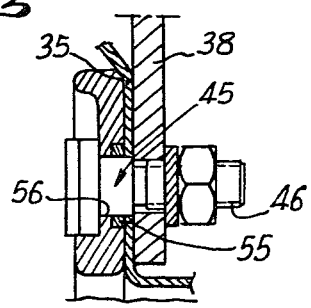
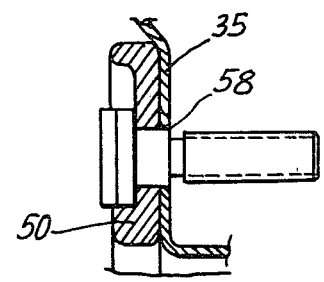

BRAKING BOOSTER SERVO UNIT HAVING A FIXING BRACING MEMBER

The present invention relates to a braking booster servo unit having a fixing bracing member and more particularly, an improvement in such an arrangement, which makes it possible to envisage mounting it on the vehicle by means of only two fixing screws.

Vacuum-type servo units are well known in the braking art. A device of this kind is generally interposed between the brake pedal and the master cylinder. Such devices have a casing having an axis of symmetry, along which an actuating force is transmitted by means of an axial actuating rod. The actuating rod is mechanically coupled to the brake pedal. Most devices have two parallel end walls, a first wall which is intended to be fixed to a fixed part of the vehicle and a second wall on which the master cylinder is directly mounted so that the casing of the servo unit, at the same time, forms the carrier for the master cylinder. Consequently, the braking force which is produced by the driver of the vehicle pressing the brake pedal is transmitted to the input of the master cylinder by way of the above-mentioned actuating rod. During operation reaction force is developed on the casing which force tends to deform the servo unit casing in the axial direction. The reaction force is carried at the first wall by means of four mounting screws. The heads of the mounting screws are disposed within the casing of the servo unit while the threaded portions thereof project outwardly of the casing perpendicularly to said first wall in a direction parallel to the axis of symmetry for the servo unit. The four screws provide for fixing the unit to a fixed part of the vehicle and are arranged at equal spacings relative to the axis of symmetry and are distributed regularly therearound.

In addition, attempts have been made to reduce the weight of the servo unit assembly, in particular by reducing the thickness of the sheet metal of the casing and/or using materials of lower density, such as for example aluminium. This has resulted in the provision of an annular bracing member within the casing between the heads of the four mounting screws of known servo units, and the inside face of the first wall. The bracing member is provided in order for the actuating forces to be distributed over a large area of said first wall so as to prevent any permanent deformation thereof in the vicinity of the heads of the mounting screws. Recently, a servo unit has been proposed, which is fixed to the vehicle only by means of two mounting screws. It being appreciated that the purpose of this arrangement is to save time in mounting the unit on the vehicle in mass production. It has been found that the above-mentioned annular bracing member was no longer as satisfactory as hitherto, in performing its function of distributing stresses since the stresses are essentially localised in the vicinity of the two mounting screws. This invention makes it possible to overcome this problem by providing an annular bracing member which is initially deformed and stressed upon assembly to provide for better distribution of the stresses over substantially the whole surface area of said wall.

More precisely, this invention concerns a vacuum-type braking booster servo unit having a casing with an axis of symmetry along which an actuating force can be transmitted by means of an axial actuating rod connected to a brake pedal. The casing has two substantially parallel end walls. A first wall is intended to be fixed to a fixed part of the vehicle and a second wall on which a brake actuating master cylinder can be mounted in axial alignment with said actuating rod for receiving the actuating force at its input. The servo unit is designed to be fixed to said fixed part by means of two screws or the like, the threaded portions of which project perpendicularly outwardly of said first wall substantially parallel to said axis of symmetry and on respective sides thereof. The screws being in contact with the inside face of said first wall by way of an annular bracing member, the bracing member, before mounting of the unit, has an initial shape which is curved in a given direction, forming a clearance betweeen said inside face and two regions of said bracing member against which said screws bear. The bracing member is pressed against said inside face by fixing of said screws with respect to said casing.

The servo unit may be so designed that the bracing member is pressed against the above-mentioned inside face only at the moment that the servo unit is mounted on the above-mentioned fixed part of the vehicle. In contrast, in an alternative form, the two screws may be previously mounted by a crimping or welding operation to said first wall of the casing of the servo unit, before the unit is mounted on the vehicle. In this case it is the crimping or welding of the screws which makes it possible to cause the annular bracing member to be forcibly applied against said inside face.

The invention will be better appreciated and other details and advantages thereof will be more clearly apparent from the following description which is given solely by way of example and with reference to the accompanying drawings in which:

FIG. 1 shows a servo unit provided with the improvement according to the invention, shown in cross-section taken along line I—I in FIG. 2, FIG. 2 is a view in section taken on line II—II in FIG. 1, FIG. 3 is a view of the annular bracing member alone, taken in section along line III—III in FIG. 2, showing the initial configuration of the bracing member, FIG. 4 is another view of the bracing member alone, in section taken along line IV—IV in FIG. 2, and also showing the initial configuration of the bracing member, FIG. 5 is a detail view showing the fixing of the servo unit of FIG. 1 to a fixed part of the vehicle, and FIG. 6 is another similar detail view showing an alternative form of the arrangement in FIG. 1, in which the bracing member is pressed against the wall of the servo unit before the assembly is mounted on a vehicle.

Referring to the drawings, shown therein is a braking booster servo unit 11 of vacuum type, which is provided with the improvement according to the invention. In conventional manner, the servo unit comprises a casing 12 formed by two shell portions 13 and 14, and an actuating piston 15 which divides the interior of the casing 12 into two pressure chambers 16 and 17. The piston 15 comprises a flexible diaphragm 18 of rubber, a rigid plate 19 and an axial central hub portion 20, of bakelite. The edges of the shell portions 13 and 14 are so shaped that they can be assembled together by a crimping action, while gripping an external peripheral enlarged flange portion 21 of the diaphragm 18. The chamber 16 is intended to be connected to a vacuum source by way of a connecting member 25. The casing 12 has an axis of symmetry 26, along which an actuating force can be transmitted by way of an axial actuating rod 27 which is connected to the brake pedal (not shown). The hub portion 20 also houses a three-way valve mechanism 29 which is controlled by the actuating rod 27.

The structure of such a valve mechanism 29 is well known in the art and is not described in detail herein as the invention does not relate thereto. It will simply be recalled that the valve mechanism 29 provides for a communication between the chamber 17 and the chamber 16 in the rest condition while, when the valve mechanism is actuated, it provides a communication between the chamber 17 and atmosphere, by way of an opening 30, thereby to cause the assembly of the actuating piston 15 to be displaced towards the left in FIG. 1, under the effect of the pressure difference in the chambers 16 and 17. A spring 31 which bears against the shell portion 13 urges the piston 15 into its rest position against the shell portion 14 as shown in FIG. 1.

The casing 12 is so shaped as to have two substantially parallel end walls 35 and 36. The first wall 35 is intended to be fixed to a fixed part such as the firewall between the engine and passenger compartments (38 in FIG. 5) of the vehicle while the second wall 36 forms the carrier for the master cylinder (not shown). The master cylinder is mounted in axial alignment with the actuating rod 27 by screws 40 which are fixed with respect to the casing 12 in order to receive the above-mentioned actuating force from axial thrust rod 42 of the hub portion 20.

In accordance with the aim of the present invention, the servo unit 11 is designed to be fixed to a fixed part (the firewall) of the vehicle by means of only two mounting screws 45 or the like. The threaded portions 46 of screws 45 which project outwardly of the casing 12 are substantially perpendicularly to the first wall 35 while, within the casing 12, the screws 45 are in contact with the inside face 48 of the first wall 35 by way of an annular bracing member 50. It should be noted that, in FIG. 1, the bracing member 50 is not shown in its definitive position, after the servo unit has been mounted in place, that is to say, pressed against the whole of the inside face 48. In fact, in accordance with the invention, the member 50 is of an initial profile which is curved in a given direction, providing a clearance e between the inside face 48 and two regions 51 of the bracing member, against which the screws 45 bear. However, when the screws 45 are definitively fixed with respect to the casing 12, the bracing member 50 is forcibly pressed against substantially the whole of the inside face 48 of the wall 35, and the clearance e vanishes. This condition is shown in FIGS. 5 and 6.

The particular configuration of the bracing member 50 can be clearly seen from FIGS. 3 and 4 in which the bracing member is shown in isolation from the remainder of the system and placed freely on a flat reference surface 48a which symbolises the above-mentioned inside face 48 of the wall 35. It can thus be seen that, in the embodiment illustrated, the bracing member 50 is arranged with its concave side towards the surface 48a (see FIG. 4), that is to say, towards the inside face 48 when it is placed in the casing 12, the above-mentioned initial curved profile being at least approximately oriented in a direction perpendicular to a diameter of the bracing member, which extends through the positions of the screws 45; the above-mentioned perpendicular direction is that of the section plane of FIG. 4. In this way, the initial contact regions 52 the bracing member 50 and the flat surface 48a are substantially at 90° with respect to the positions of the screws 45, that is to say, precisely at the locations at which the two other fixing screws were previously arranged, which two other screws can now be omitted by virtue of the particular configuration of the member 50.

In another equivalent embodiment, the bracing member, before being mounted in place, may have its convex side directed towards the inside face of the first wall, and in this case the initial curved profile of the bracing member must be at least approximately oriented along a diameter thereof which passes through the positions of the screws 45. Both cases will provide substantially the same clearance e in the vicinity of the regions 51, and initial contact in the vicinity of the regions 52.

Several possible designs can be employed for definitive fixing of the screws 45 with respect to the casing 12. In FIG. 5, the definitive fixing operation is effected only at the moment that the servo unit is mounted on a fixed part 38 of the vehicle. In that case, the member 50 is provided with two seals 55 mounted around holes 56 through which the screws 45 pass, and disposed on the face of the bracing member which is towards the wall 35. In this embodiment, mounting of the servo unit on the vehicle both seals the servo unit at the location of the screws 45, and causes stressing of the bracing member 50.

In the alternative form shown in FIG. 6, the two screws 45 are definitively fixed with respect to the wall 35 of the casing by means of a sealing crimping portion 58 which causes the bracing member 50 to be forcibly applied against the inside face of the wall 35. The crimping portion 58 may be replaced by a weld.

When the bracing member is thus forcibly applied, that is to say, stressed, against the inside face 48, the result is better distribution of the reaction of the casing 12 to the braking forces which are applied to the mounting wall 35, the reaction being distributed over substantially the entire surface area of the first wall.

I claim:

1. A braking booster servo unit of vacuum type comprising a casing having an axis of symmetry along which an actuating force is transmitted by means of axial actuating rod connected to the brake pedal, said casing having two substantially parallel first and second end walls, said first wall being attached to a fixed part of a vehicle, said second wall holding a brake actuating master cylinder in axial alignment with said actuating rod for receiving said actuating force at its input, said first end wall having an inside face, said servo unit being designed to be attached to said fixed part by means of two screws, each of said screws having threaded portions which project perpendicularly outwardly of said first wall substantially parallel to said axis of summetry and on respective sides thereof, said screws being in contact with the inside face of said first wall by way of an annular bracing member, wherein the improvement consists in that said bracing member is elastic and has a face with a curved surface, said curved surface having diametrically opposed first and second areas and angularly offset diametrically opposed third and fourth areas, said first and second areas engaging said inside face of said first end wall, said third area being connected to one of said two screws and said fourth area being connected to the other of said two screws, said two screws on attachment to said fixed part transmitting a variable prestress force into said first end wall through said first and second areas of said bearing member.

2. A servo unit according to claim 1, wherein said prestress is obtained by elastic deformation of the elastic bracing member due to the prestress by said screws of said elastic annular bracing member on said inside face of said first wall.

3. A servo unit according to claim 2, wherein said elastic bracing member has a concave face directed away from said first wall, said screws being located where their action on the bracing member gives the maximal elastic deformation of the latter.

4. A servo unit according to claim 1, wherein said elastic bracing member has a convex face direct away from said first wall, said screws being located where their action on the bracing member gives the maximal elastic deformation of the latter.

* * * * *